United States Patent
Richardson et al.

(10) Patent No.: US 7,008,715 B2
(45) Date of Patent: Mar. 7, 2006

(54) THERMAL AND VIBRATIONAL BREAK FOR HIGH-TEMPERATURE GAS TUBES IN A SOLID-OXIDE FUEL CELL

(75) Inventors: Curtis A. Richardson, Voorheesville, NY (US); Karl J. Haltiner, Jr., Fairport, NY (US); Sean M. Kelly, Churchville, NY (US); Bernard Edlinger, Augsburg (DE)

(73) Assignee: Delphi Technologies, Inc., Troy, MI (US)

( * ) Notice: Subject to any disclaimer, the term of this patent is extended or adjusted under 35 U.S.C. 154(b) by 231 days.

(21) Appl. No.: 10/178,862

(22) Filed: Jun. 24, 2002

(65) Prior Publication Data

US 2003/0235741 A1    Dec. 25, 2003

(51) Int. Cl.
*H01M 2/00* (2006.01)
*H01M 2/14* (2006.01)
(52) U.S. Cl. .......................... 429/34; 429/39; 429/38; 429/30
(58) Field of Classification Search .................. 429/39, 429/34, 38, 30
See application file for complete search history.

(56) References Cited

U.S. PATENT DOCUMENTS

| | | | |
|---|---|---|---|
| 4,921,680 A * | 5/1990 | Bonk et al. | 422/197 |
| 5,460,897 A * | 10/1995 | Gibson et al. | 429/39 |
| 5,595,833 A * | 1/1997 | Gardner et al. | 429/19 |
| 5,733,675 A | 3/1998 | Dederer et al. | |
| 6,279,615 B1 * | 8/2001 | Iio et al. | 138/137 |
| 6,321,145 B1 | 11/2001 | Rajashekara | |
| 6,423,896 B1 | 7/2002 | Keegan | |
| 6,455,185 B1 | 9/2002 | Bircann et al. | |
| 6,485,852 B1 | 11/2002 | Miller et al. | |
| 6,509,113 B1 | 1/2003 | Keegan | |
| 6,551,734 B1 | 4/2003 | Simpkins et al. | |
| 6,562,496 B1 | 5/2003 | Faville et al. | |
| 6,608,463 B1 | 8/2003 | Kelly et al. | |
| 6,613,468 B1 | 9/2003 | Simpkins et al. | |
| 6,613,469 B1 | 9/2003 | Keegan | |
| 6,627,339 B1 | 9/2003 | Haltiner, Jr. | |
| 6,630,264 B1 | 10/2003 | Haltiner, Jr. et al. | |
| 2002/0051857 A1 * | 5/2002 | Nishiyama | 428/36.91 |

* cited by examiner

*Primary Examiner*—Patrick Joseph Ryan
*Assistant Examiner*—Angela J. Martin
(74) *Attorney, Agent, or Firm*—Paul L. Marshall

(57) ABSTRACT

A fuel cell assembly or system including flexible metal bellows elements in one or more tubes intended for carrying hot gases during operation of the assembly. The bellows elements include a tubing element having plurality of annular corrugated folds. Thermal expansion and contraction of rigid tubes and of the non-tubular elements of the assembly can lead to buckling, cracking, and failure of the tubes and failure of the assembly or system. The flexible bellows elements, having relatively low axial and radial spring rates thus are able to absorb thermal and vibrational dimensional changes in the assembly. In addition, the corrugations provide significant resistance to axial heat flow and large radiant surface area, thus increasing thermal isolation where desired between relatively hot and relatively cold regions of the assembly.

19 Claims, 6 Drawing Sheets

THERMAL AND VIBRATIONAL BREAK FOR HIGH-TEMPERATURE GAS TUBES IN A SOLID-OXIDE FUEL CELL

TECHNICAL FIELD

The present invention relates to hydrogen/oxygen fuel cells; more particularly, to solid-oxide fuel cell assemblies and systems including piping for high-temperature gases; and most particularly, to solid-oxide fuel cell assemblies and systems wherein piping for high-temperature gases includes means for thermal and vibrational isolation of the high-temperature portion of the assembly from its surroundings.

BACKGROUND OF THE INVENTION

Fuel cells which generate electric current by the electrochemical combination of hydrogen and oxygen are well known. In one form of such a fuel cell, an anodic layer and a cathodic layer are deposited on opposite surfaces of an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode where it is ionized. The oxygen anions transport through the electrolyte and combine with hydrogen ions to form water. The cathode and the anode are connected externally through a load to complete the circuit whereby electrons are transferred from the anode to the cathode. When hydrogen is derived from "reformed" hydrocarbons, the reformate gas includes CO which is converted to $CO_2$ at the anode via an oxidation process similar to the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

A typical SOFC assembly comprises a variety of metallic and non-metallic materials. Heated gases such as O2 and reformate are communicated around the assembly using metal tubes at internal pressures of, for example, 2.2 psig. The ends of these tubes are hard mounted as by welding, brazing, or bolting to a rigid member. As the tubes are subjected to extreme temperature excursions during start-up, operation, and shut-down of the assembly, significant dimensional changes in tube length can occur. Simultaneously, the SOFC assembly itself is subjected to high temperature excursions creating its own dimensional changes. Hard mounted tubing under these conditions is subjected to high stresses, both thermal and vibrational, which can cause buckling, bending, cracking, and failure of the tubular members. Catastrophic failure of these tubes allows the escape of explosive or reactive gases into the atmosphere.

It is a principal object of the present invention to prevent damage and failure in an SOFC assembly from thermal or vibrational overstress of tubing and piping.

It is a further object of the invention to reduce heat loss from the high temperature zone of the SOFC system.

It is a further object of the invention to increase the reliability and working lifetime of an SOFC assembly.

SUMMARY OF THE INVENTION

Briefly described, a fuel cell assembly or system in accordance with the invention includes flexible metal bellows elements in one or more tubes intended for carrying hot gases during operation of the assembly. Thermal expansion and contraction of the tubes, and of the non-tubular elements of the assembly, during start-up, running, and shut-down of the assembly can lead to buckling, cracking, and failure of the tubes, resulting in failure of the assembly or system. The flexible bellows elements, having relatively low axial and radial spring rates, or stiffness, thus are able to absorb thermal and vibrational dimensional changes, thereby protecting the rest of the assembly from potentially damaging stresses. In addition, because the bellows elements have relatively thin walls and relatively large wall area per linear unit of tubing, the corrugations provide significant resistance to axial heat flow and large radiant surface area, thus increasing thermal isolation where desired between relatively hot and relatively cold regions of the assembly.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
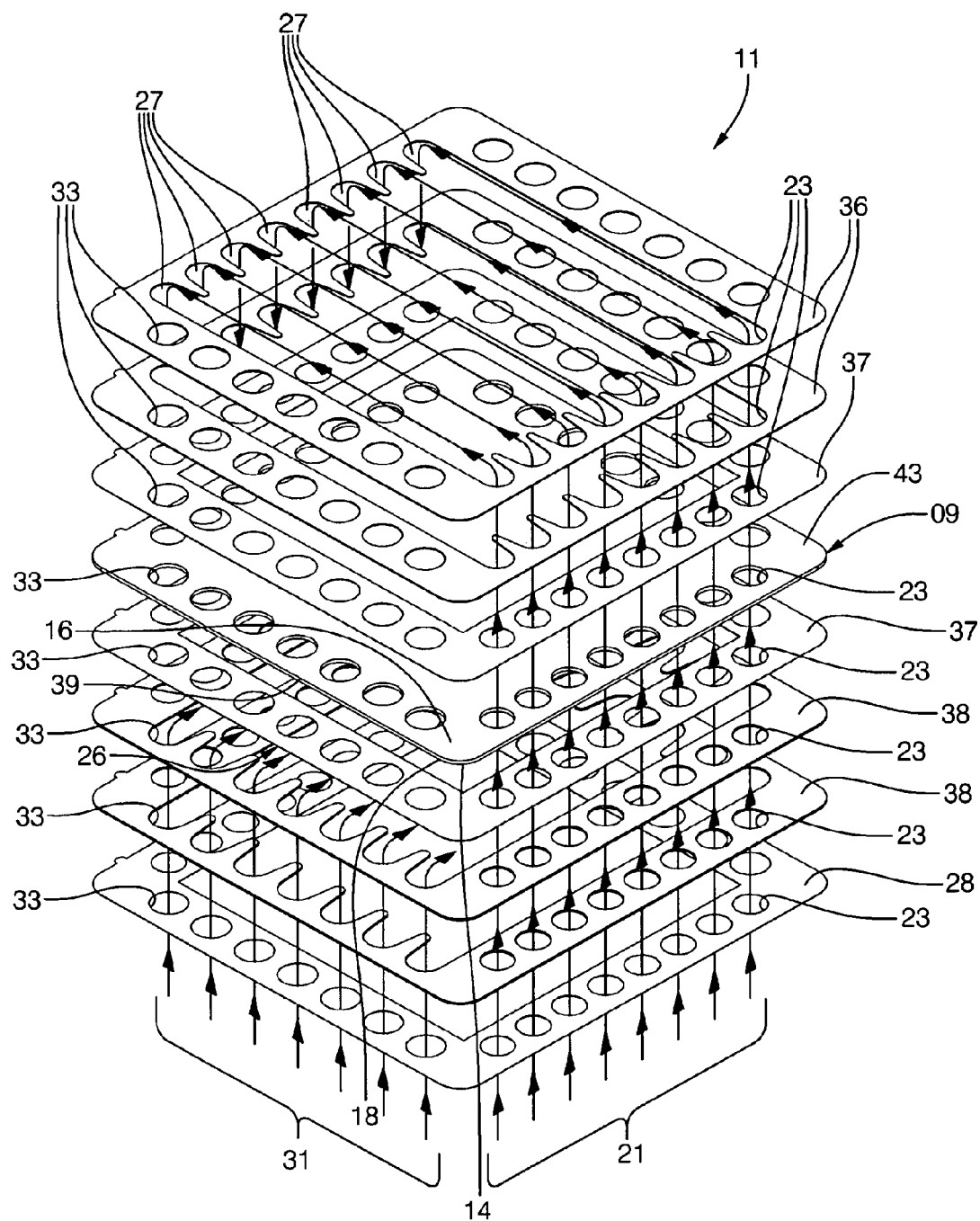
FIG. 1 is an exploded isometric view of a single solid oxide fuel cell, showing the various elements and the flow paths of fuel and oxygen through the cell.
Figure 2:
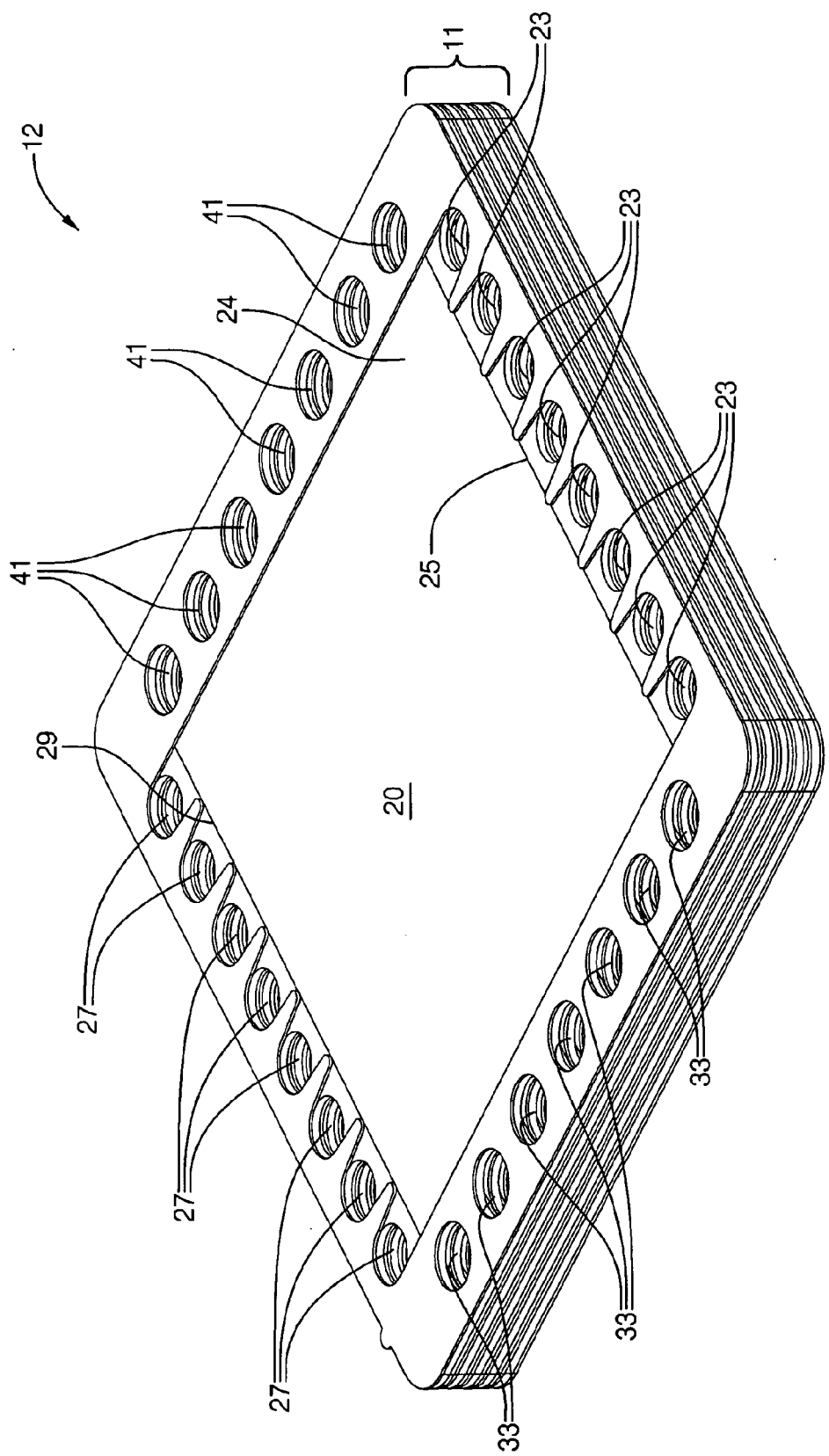
FIG 2 is an isometric view of a fuel-cell stack comprising five cells like the cell shown in FIG. 1.
Figure 3:
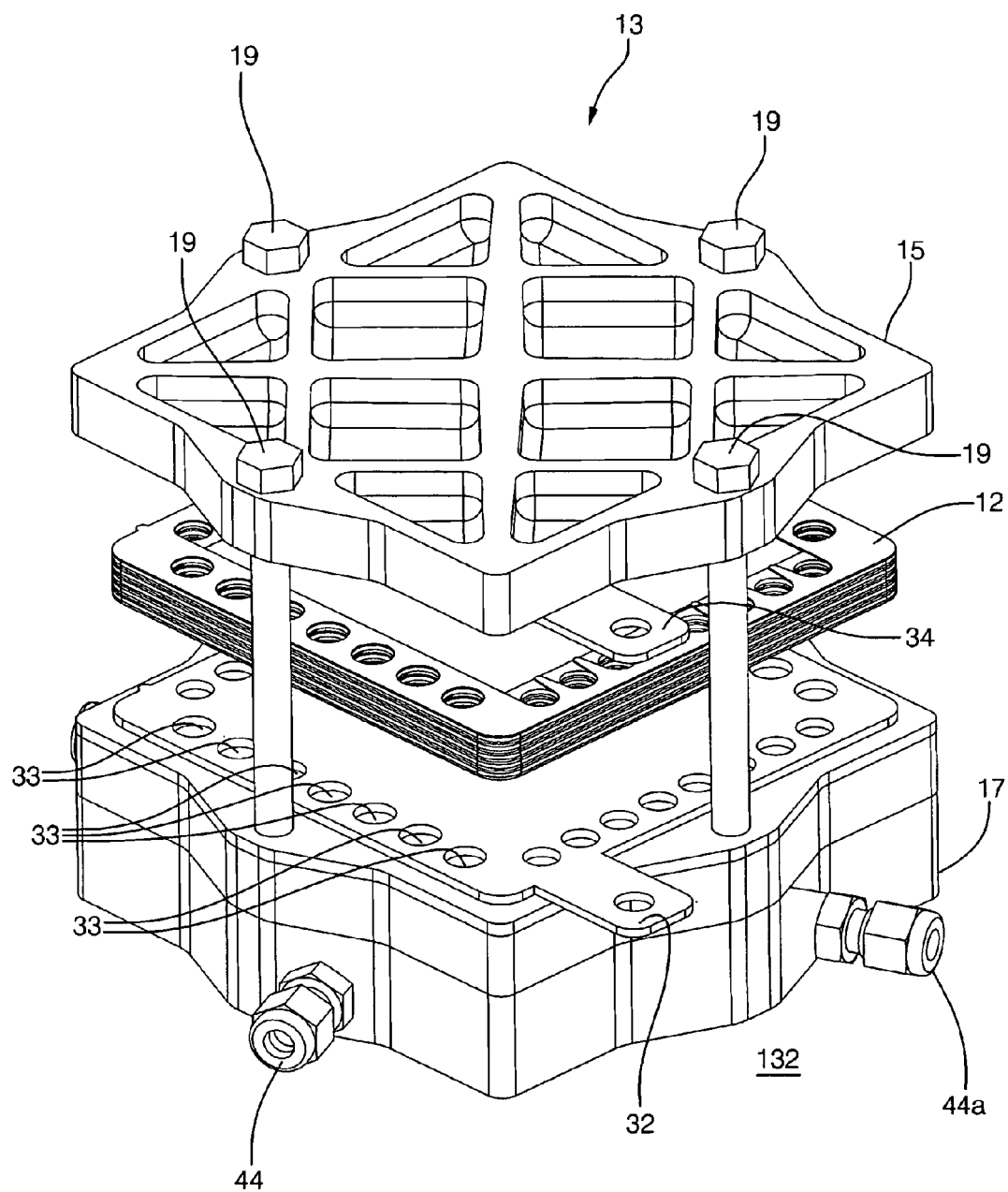
FIG. 3 is an isometric view like that shown in FIG. 2, partially exploded, showing the addition of current collectors, end plates, and bolts to form a complete fuel cell stack ready for use.
Figure 4:
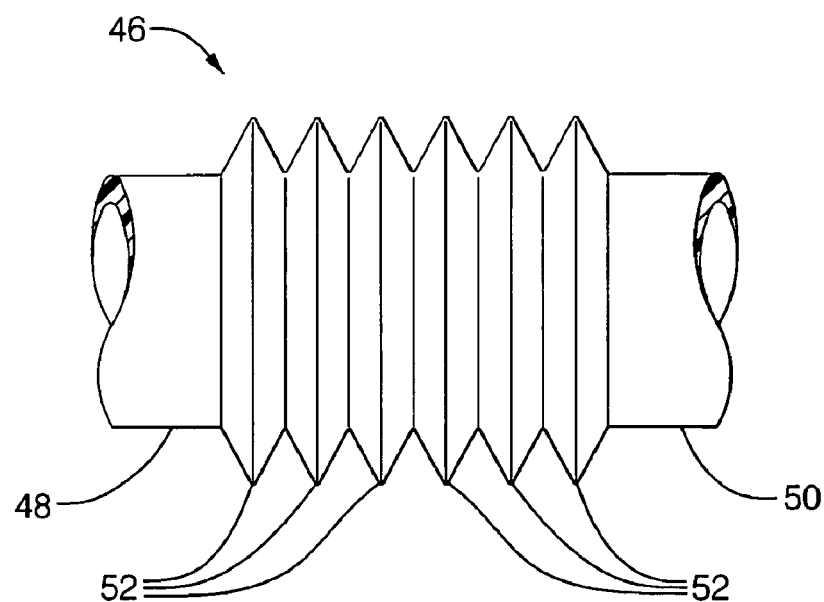
FIG. 4 is an elevational view of a metal bellows element for use in a fuel cell assembly or system in accordance with the invention.
Figure 5:
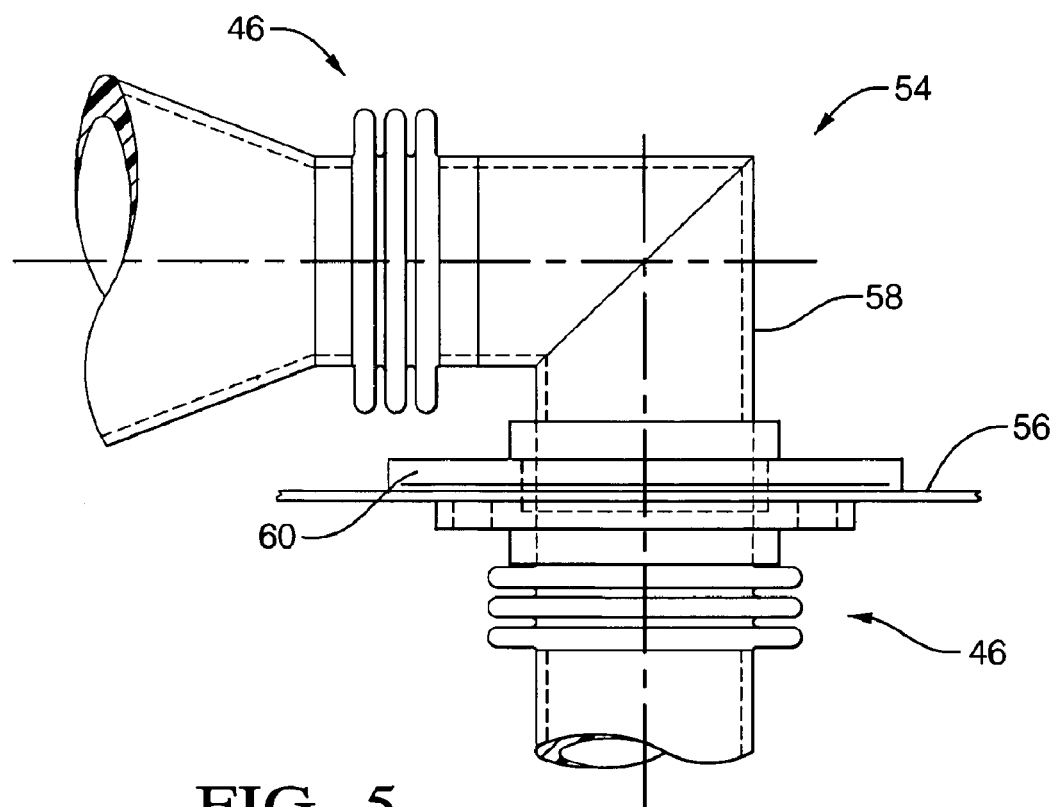
FIG. 5 is an elevational view showing metal bellows elements so incorporated into gas tubing

FIGS. 1 through 3 are useful in describing generally the structure of a multiple fuel cell stack assembly. FIGS. 4 and 5 are illustrative of improved fuel cell assemblies in accordance with the invention.

Referring to FIGS. 1 and 2, an individual fuel cell 11 includes a multilayer fuel cell element 09 comprising an electrolyte 14 (E) having an anode 16 or positive element (P) deposited on a first surface thereof and a cathode 18 or negative element (N) deposited on a second surface thereof. Thus, element 09, which is the actual "fuel cell," is known in the art by the acronym PEN. Passage 24 for flow of fuel 21 across the free surface 20 of anode 16 is provided by first cut-out spacers 36 sealed to anode 16 by peripheral seal 37, and passage 26 for flow of air 31 across the free surface of cathode 18 is provided by second cut-out spacers 38 sealed to cathode 18 by another peripheral seal 37. Fuel 21, typically in the form of hydrogen or reformate gas, is provided at a first edge 25 of anode surface 20 via supply conduits 23 formed in each element and is removed via exhaust conduits 27 provided at a second and opposite edge 29 of anode surface 20. Oxygen, typically in the form of air, is provided via supply conduits 33 to passages 26 at a first edge 39 of cathode 18 and is removed via exhaust conduits 41 at a second and opposite edge 43 of cathode 18.

Referring to FIG. 3, a plurality of fuel cells 11 may be stacked together to form a stack 12, five such cells being shown in FIG. 2. In a complete working fuel cell assembly 13, stack 12 is sandwiched between an anodic current collector 34 and a cathodic current collector 32 which in turn are sandwiched between a top plate 15 and a gas-manifold base 17, the entire assembly being bound together by bolts 19 extending through bores in top plate 15 and threadedly received in bores in base 17. Air is provided to base 17 for supply to conduits 33 via a first connector 44. Fuel is provided to base 17 for supply to conduits 23 via a second connector 44a. Both of connectors 44 and 44a represent the termini of tubing runs both within and without base 17, which runs are subject to very large temperature extremes in the range of about −40° C. to about 1000° C. during start-up, operation, and shut-down of the stack. Further, temperatures within base 17 at times may be very much higher than desired temperatures outside of base 17.

Referring to FIG. 4, a flexible tubular bellows element 46 includes first and second tubular ends 48,50, corresponding to an inlet and an outlet, having about the same diameter as a tubular element into which bellows element 46 may be inserted, for example, fittings 44,44a. Annular corrugated folds 52 transverse to the axis of the tubing are radially formed into a tubing blank as by hydroforming or other conventional method of mechanically deforming material. The bellows folds may be relatively sharp, as shown in FIGS. 4, as may result from tooling deformation, or they may be more rounded, as shown in FIG. 5, as may result from hydroforming. The wall thickness is preferably between about 0.005" and about 0.010", depending upon the overall size of the tubing and bellows desired. The wall thickness of non-bellows tubing before forming may be about 0.030"; therefore, the thin-wall section in the bellows, rated at several atmospheres rupture pressure, and having a greatly enlarged radiative surface area and greatly lengthened and thinned thermal conductive path, acts to restrict heat transfer along the tubing. Of course, as noted above, the bellows itself acts to provide flexibility in an otherwise rigid length of tubing and thus can absorb thermal expansion differences and vibrational excursions.

Figure 6:
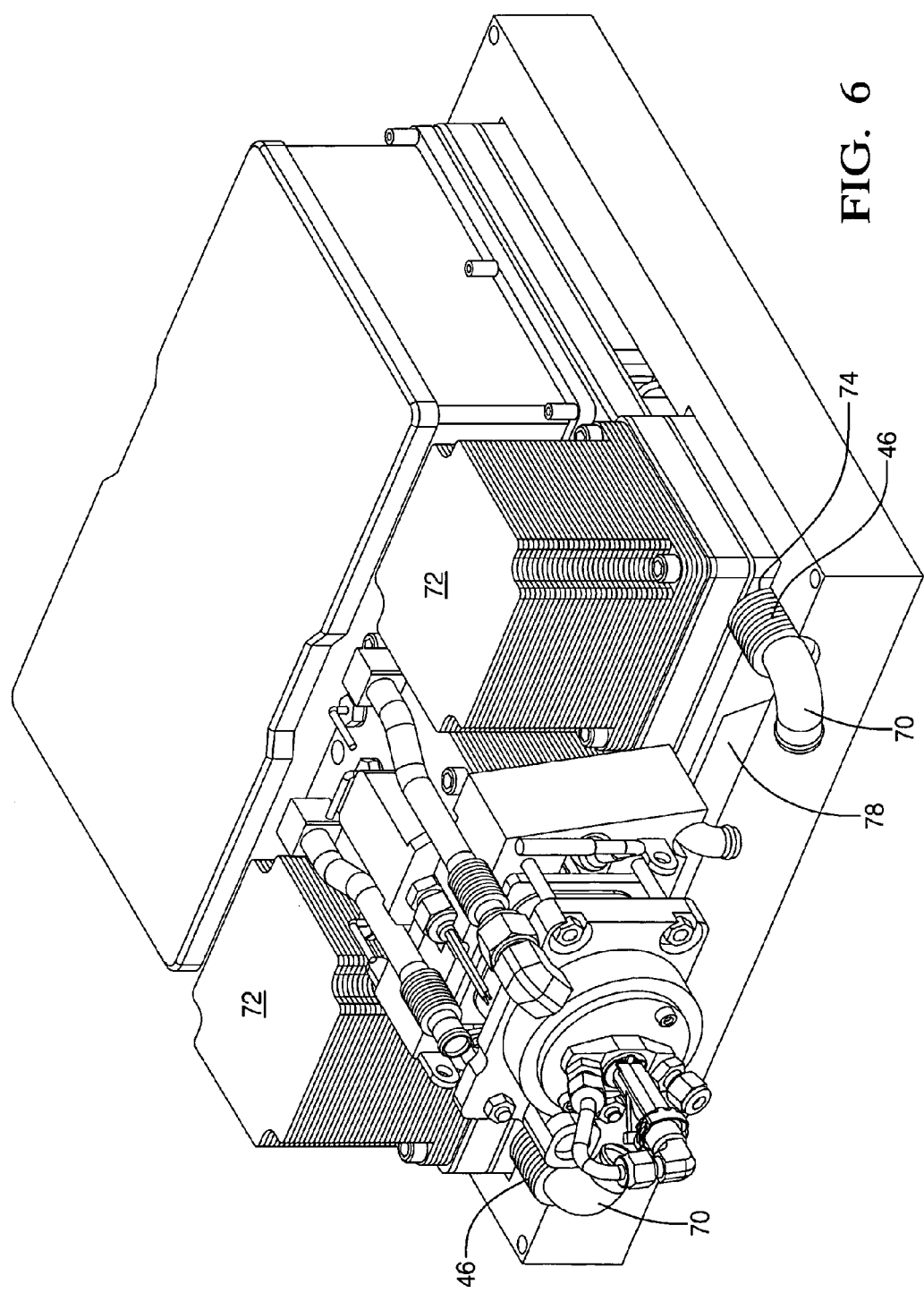
FIG. 6 is an isometric view of part of a fuel cell assembly showing the bellows elements incorporated into gas tubing entering and exiting the assembly.
Figure 7:
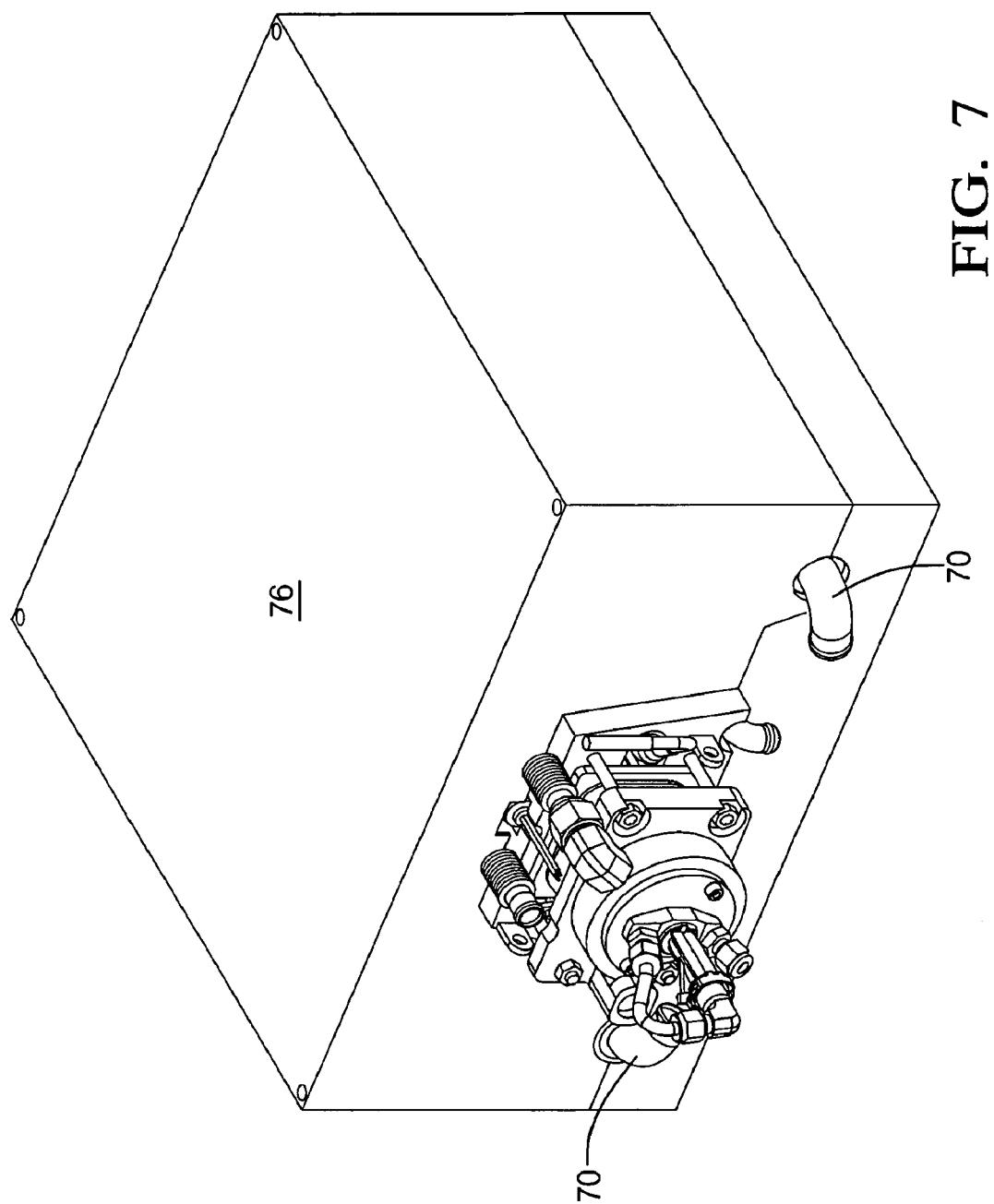
FIG. 7 is an isometric view of the assembly shown in FIG. 6, with its insulated cover installed.

Referring to FIG. 5, in a portion 54 of a fuel cell assembly, for example, assembly 13, includes a rigid wall element 56 and a tubing element 58 for carrying gas through wall element 56. Tubing element 58 is secured to the wall element by a bulkhead fitting 60. On either side of the wall, the tubing element 58 includes a flexible bellows element 46 in accordance with the invention, to absorb mechanical vibrations in element 58 and to compensate for differential thermal expansions in the assembly. Bellows element 46 may be attached into tubing element 58 on either side of the annular corrugated folds 52 by any suitable conventional means such as welding, brazing, or threading. By way of example with reference to FIG. 6, a portion of a fuel cell assembly is shown. Air supply and return tubes 70 are shown entering and exiting cathode heat exchangers 72 through bores in exchanger wall 74 as described above. Bellows elements 46 can be seen in this view. Referring now to FIG. 7, insulated cover 76 is shown in place thereby forming an insulated hot zone 78 inside the fuel cell assembly. Thus, in this application, bellows elements 46 serve to absorb vibrations that would otherwise be transmitted to a rigidly mounted air tube. Moreover, the bellows elements serve to compensate for thermal expansion of the tubes caused by the temperatures differences exerted on the tubes from inside and outside the hot zone. Further, because of the thinned thermal conductive path of the bellows, the bellows elements serve to minimize heat loss from the hot zone.

A fuel cell assembly in accordance with the invention is especially useful as an auxiliary power unit (APU) for vehicles 132 on which the APU may be mounted as shown in FIG. 3, such as cars and trucks, boats and ships, and airplanes, wherein motive power is supplied by a conventional engine and the auxiliary electrical power needs are met by the SOFC assembly.

A fuel cell assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly, comprising:
   a) tubing for conveying gas in said assembly, said tubing having a first thickness; and
   b) at least one tubular flexible bellows element disposed in said tubing for the purpose of absorbing differential thermal expansion in said tubing and said assembly, said at least one tubular flexible bellows element having a second thickness of about 20% to about 30% of said first thickness.

2. A fuel cell assembly in accordance with claim 1 wherein said tubular flexible bellows element is formed of metal.

3. A fuel cell assembly in accordance with claim 1 wherein said tubular flexible bellows element comprises:
   a) an inlet portion;
   b) an outlet portion; and
   c) a plurality of annular corrugated folds between said inlet portion and said outlet portion.

4. A fuel cell assembly in accordance with claim 1 wherein the temperature of said gas in said tubing is variable between about −40° C. and about 1000° C.

5. A fuel cell assembly in accordance with claim 1 wherein said assembly includes a solid-oxide fuel cell.

6. A fuel cell assembly in accordance with claim 1 wherein said tubular flexible bellows element is provided for the purpose of absorbing vibrations being transmitted along said tubing.

7. A fuel cell assembly in accordance with claim 1 wherein said tubular flexible bellows element is provided for the purpose of restricting transmission of heat along said tubing.

8. A fuel cell assembly, comprising:
   a rigid wall of the fuel cell assembly;
   tubing for carrying gas through said rigid wall, said tubing being secured to said rigid wall;
   a first tubular flexible bellows disposed in said tubing and being positioned on a first side of said rigid wall; and
   a second tubular flexible bellows disposed in said tubing and being positioned on a second side of said rigid wall.

9. A fuel cell assembly in accordance with claim 8 wherein at least one of said first and second tubular flexible bellows absorbs mechanical vibrations in said tubing and compensates for differential thermal expansions in the assembly.

10. A fuel cell assembly in accordance with claim 8 wherein said first and second tubular flexible bellows are formed of metal.

11. A fuel cell assembly in accordance with claim 8 wherein said tubing is secured to said rigid wall by a bulkhead fitting.

12. A fuel cell assembly in accordance with claim 8 wherein said first tubular flexible bellows comprises:
   a) an inlet portion;
   b) an outlet portion; and
   c) a plurality of annular corrugated folds between said inlet portion and said outlet portion.

13. A fuel cell assembly in accordance with claim 8 wherein the temperature of said gas in said tubing is variable between about −40° C. and about 1000° C.

14. A fuel cell assembly in accordance with claim 8 wherein the assembly includes a solid-oxide fuel cell.

15. A fuel cell assembly in accordance with claim 8 wherein said tubing has a thickness of about 0.030 inches.

16. A fuel cell assembly in accordance with claim 8 wherein at least one of said first and second tubular flexible bellows elements has a thickness between about 0.005 inches and about 0.010 inches.

17. A fuel cell assembly in accordance with claim 8 wherein said tubing has a first thickness, and wherein at least one of said first and second tubular flexible bellows elements has a second thickness of about 20% to about 30% of said first thickness.

18. A fuel cell assembly in accordance with claim 17 wherein said tubing has a thickness of about 0.030 inches, and wherein at least one of said first and second tubular flexible bellows elements has a thickness between about 0.005 inches and about 0.010 inches.

19. A fuel cell assembly in accordance with claim 1 wherein said tubing has a thickness of about 0.030 inches, and wherein said tubular flexible bellows element has a thickness between about 0.005 inches and about 0.010 inches.

* * * * *